United States Patent [19]

Lipson

[11] Patent Number: 5,776,572
[45] Date of Patent: Jul. 7, 1998

[54] ZONE-COATED MASKING MATERIAL

[76] Inventor: Ronald B. Lipson, 6085 Pickwood Dr., West Bloomfield, Mich. 48322

[21] Appl. No.: 788,517

[22] Filed: Jan. 24, 1997

[51] Int. Cl.⁶ ........................................ B32B 3/02
[52] U.S. Cl. .................. 428/40.1; 118/504; 118/505; 428/41.8; 428/194; 428/352; 428/906
[58] Field of Search ................... 428/40.1, 41.8, 428/906, 194, 352; 118/504, 505

[56] References Cited

U.S. PATENT DOCUMENTS

| | | | |
|---|---|---|---|
| 3,032,181 | 5/1962 | Hutter | 428/40.1 |
| 4,263,347 | 4/1981 | Banta | 427/282 |
| 4,341,828 | 7/1982 | Stephens | 428/40 |
| 4,889,759 | 12/1989 | Yamazaki | 428/181 |
| 5,250,321 | 10/1993 | Andersson et al. | 427/163 |
| 5,472,559 | 12/1995 | Cayford et al. | 156/554 |
| 5,492,750 | 2/1996 | Shumaker, Jr. et al. | 428/192 |
| 5,609,933 | 3/1997 | Stepanek | 428/41.7 |
| 5,631,055 | 5/1997 | Vines | 428/41.8 |

FOREIGN PATENT DOCUMENTS

WO 92/06794   4/1992   WIPO.

*Primary Examiner*—Nasser Ahmad
*Attorney, Agent, or Firm*—Gifford, Krass, Groh, Sprinkle, Patmore, Anderson & Citkowski

[57] ABSTRACT

Masking material of particular value to vehicular surface coating operations consists of a thin, flexible base sheet having opposing first and second longitudinal edges which define a width. A pressure-sensitive adhesive layer is applied longitudinally along at least the first edge on the inner surface of the sheet with a width substantially less than that of the base sheet, the base sheet further including a longitudinal area on its outer surface and along the first edge which functions as a release layer, enabling the base sheet with adhesive layer to be provided in roll form and easily removed therefrom for use. In an alternative embodiment, a second pressure-sensitive adhesive layer may applied longitudinally along the second edge of the sheet, this second adhesive layer also having a width substantially less than that of the base sheet, and the base sheet further including a longitudinal area along the second edge on the surface of the sheet other than that on which the adhesive layer has been applied which functions as a release layer. The material may or may not be adapted to withstand oven temperatures of the type used, for example, to cure paint.

5 Claims, 1 Drawing Sheet

5,776,572

1

ZONE-COATED MASKING MATERIAL

FIELD OF THE INVENTION

This invention relates generally to masking material of the type used in vehicle painting operations, and, in particular, to a material which integrates a base sheet and pressure-sensitive adhesive.

BACKGROUND OF THE INVENTION

When vehicles are painted for repair or "tu-toning," they must be appropriately masked. That is, those areas which are not to be coated must be covered with some type of masking film.

Currently available films for this purpose are not self-adhesive, but, rather, must be secured to exposed vehicle body surfaces with tape prior to the painting and/or curing processes. Depending upon the application, both the film and the tape may need to withstand temperatures associated with paint curing, which typically are in the range of 150°–350° F. The adhesive used with the tape must also be formulated to withstand curing temperatures with no detrimental effects.

The need for a separate masking sheet and adhesive tape further requires the use of a somewhat sophisticated dispensing apparatus wherein the tape and masking material are separately provided and joined at the time of application. The apparatus associated with this operation is bulky, and the process difficult to control. U.S. Pat. No. 5,472,559 to Cayford et al. entitled SURFACE PROTECTING ASSEMBLY AND METHOD, discloses a typical apparatus utilized for this purpose.

What is needed is a sheet of masking material applicable to vehicle masking operations which includes a selectively applied adhesive, thereby obviating the need for this integration of sheet and tape at the time of application. One paint masking assembly which includes a selectively disposed layer of pressure-sensitive adhesive is described in PCT application No. WO 92/06794 to Vines et al. entitled PAINT MASKING ASSEMBLY AND METHOD OF MASKING. According to this reference, a paint masking assembly (10) comprises a sheet of paint masking material (12) having this layer of pressure-sensitive adhesive (13) releasably adhered to a sheet of liner material (11) which is co-extensive with and extends beyond the sheet of paint masking material. However, all disclosed embodiments rely on a predetermined shape (such as a vehicular window pane), and the layer of pressure-sensitive adhesive (13) is deposited across the entire sheet or, if the sheet is large, around its entire periphery. Accordingly, this product is lacking in versatility and general application in that the shape is limited to predetermined surface geometries, requiring a separate sheet of liner material.

SUMMARY OF THE INVENTION

The present invention resides in masking material which is particularly suited to vehicular surface coating operations such as painting and other spraying procedures. The material consists of a thin, flexible base sheet having opposing first and second longitudinal edges which define a width. A pressure-sensitive adhesive layer is applied longitudinally along at least the first edge on the inner surface of the sheet, the adhesive layer having a width substantially less than that of the base sheet, the base sheet further including a longitudinal area on its outer surface and along the first edge which functions as a release layer, enabling the base sheet

2 with adhesive layer to be provided in roll form and easily removed therefrom for use. The release function may either be inherent in the base sheet material or applied as a separate layer.

In terms of material composition, the base masking material itself is preferably composed of a plastic film. The material may or may not be adapted to withstand oven temperatures of the type used, for example, to cure paint, which may be in the range of 150°–350° F. If the material is to be subjected to such heat, polypropylene, nylon, or co-extruded compositions are preferably used as the base sheet along with adhesives such as acrylics, rubber, or silicone. If higher temperatures are not seen as a problem, low- or high-density polyethylene may be employed as the base sheet material.

In an alternative embodiment, a second pressure-sensitive adhesive layer may applied longitudinally along the second edge of the sheet, this second adhesive layer also having a width substantially less than that of the base sheet, and the base sheet further including a longitudinal area along the second edge on the surface of the sheet other than that on which the adhesive layer has been applied which functions as a release layer. That is, the second adhesive layer may be located on the inner surface of the sheet and the release layer on the outer surface of the sheet, or alternatively, the second adhesive layer may be located on the outer surface of the sheet and the release layer on the inner surface of the sheet.

DETAILED DESCRIPTION OF THE PREFERRED EMBODIMENTS

Figure 1:
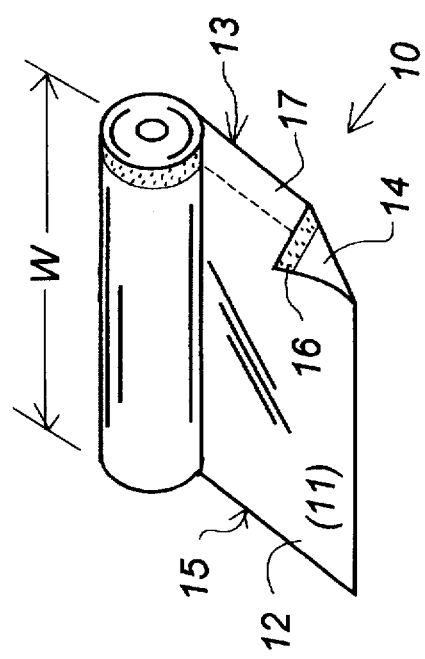
FIG. 1 illustrates a roll of masking material according to the invention.

Now making reference to the drawings, there is shown in FIG. 1 masking material in roll form according to the invention, depicted generally at 10. For the purposes herein, the material includes a base sheet 11 having what will be called an outer surface 12 and an inner surface 14, these designations being chosen since, in the embodiment shown, when applied to a surface for use, the outer surface 12 will be externally exposed, whereas the inner surface 14 will face the item to be treated. Also for definitional purposes, the sheet 11 includes a first edge 13 and a second edge 15, which may also be considered as upper and lower edges, respectively, since, in typical usage, the material 11, when removed from the roll 10, will hang downwardly in skirt-like fashion with edge 15 being lower than that of edge 13, though this is not a requirement for use.

In the preferred embodiment, longitudinally along edge 13 there is found an area of pressure-sensitive adhesive 16, preferably in the form of a longitudinal stripe having one edge co-extensive with the edge 13 of the material 11 proper. By way of just example of many, whereas the width W of the material 11 itself may be on the order of several feet, preferably the width of the pressure-sensitive adhesive area 16 will be on the order of an inch or thereabouts. Whereas, in this embodiment, the pressure-sensitive adhesive 16 is on the inner surface 14 of the material 11, on the opposite or outer surface 12, one finds an area 17 which functions as a release layer, such that, with the material 11 provided in roll form, it may be easily dispensed therefrom, that is, with the pressure-sensitive adhesive 16 relatively easily disengaging from the area of the outer surface 12 against which it has been placed when in roll form. This release layer 17 may either be inherent in the material itself, or may be applied as a separate (i.e., no-stick) layer to ease with this disengagement upon dispensing of the material 11. Although the width of the release layer 17, which is also preferably provided in the form of a longitudinal stripe, may be substantially the same as that of adhesive area 16, preferably it is somewhat wider to ensure the release function.

Figure 2:
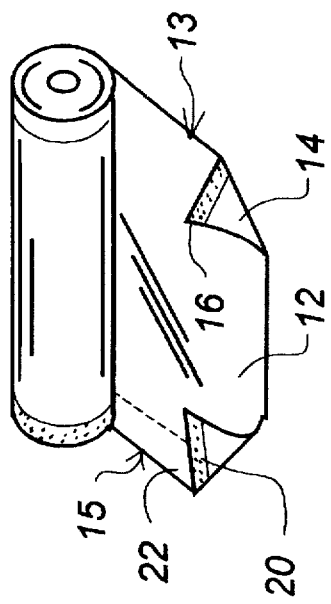
FIG. 2 is an illustration of an alternative embodiment of the invention wherein both opposing longitudinal edges include a pressure-sensitive adhesive.

In FIG. 2, there is shown an alternative embodiment of the invention, wherein both edges 13 and 15 include this pressure-sensitive adhesive, in FIG. 2 this additional stripe being indicated with numerical indicator 20. Preferably also, the stripe 20 is made available in combination with a separate release region 22 associated with the lower edge 15, such that the material may, again, be easily dispensed if provided in roll form.

Figure 3:
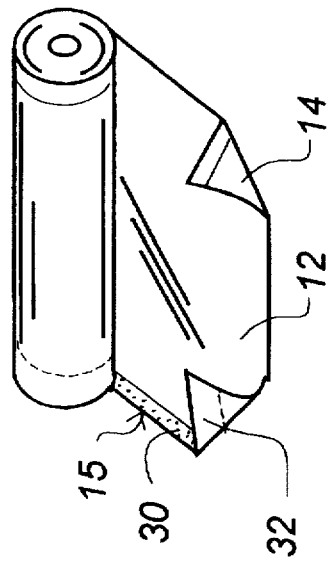
FIG. 3 is a further alternative embodiment of the invention wherein both longitudinal edges include a pressure-sensitive adhesive, but wherein such adhesive is applied to opposite surfaces of the masking material.

FIG. 3 shows yet a further alternative embodiment of the invention. Whereas, in FIG. 2, the pressure-sensitive adhesive stripes 16 and 20 are both disposed on the inner surface 14 of the sheet, in FIG. 3, note that the pressure-sensitive adhesive associated with one edge is on this inner surface. Also, at the lower edge 15, the pressure-sensitive adhesive 30 is disposed on the outer surface 12, with, preferably, a region 32 on the inner surface 14 acting as a release layer therefore.

Figure 4:
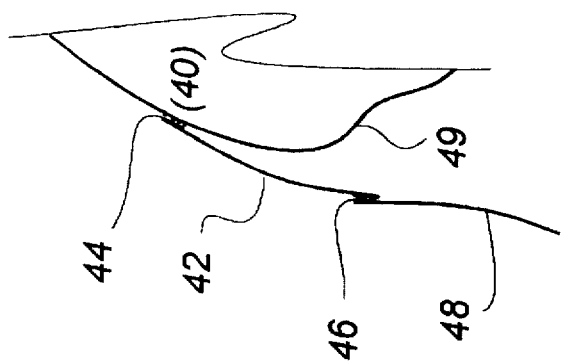
FIG. 4 is a drawing which shows how a non-adhesive sheet of masking material may be adhered to the material depicted in FIG. 3 to form a longer skirt of masking surface.

One advantage of having the adhesive strips on either side of the sheet is depicted in FIG. 4, wherein a sheet of this type 42 is applied to a surface of a body 40 using adhesive 44 on the inner surface of the sheet, but, with the second adhesive strip 46 associated with the lower edge being externally exposed, it is more easily accessible for the purposes of adding a separate sheet 48 which may, or may not, have an adhesive of its own so as to lengthen the overall height of the sheet thereby protecting areas 49 which may fall below those of the lower edge of sheet 42.

As discussed above in the Summary of the Invention, the various materials introduced herein may, or may not, be adapted to withstand baking at times and temperatures typically used in paint curing operations, which tend to be in the range 150°–350° F. for an hour or more, while still being readily removable from the surface upon which such materials were placed for masking operations. If such oven heating is not an issue, the material forming the base sheet 11 may be plastic such as low- or high-density polyethylene, for example.

If, however, the material is subjected to oven curing temperatures, preferably polypropylene, nylon or co-extruded materials are used to handle this heat. In terms of the adhesive, generally cured acrylics, rubber and silicone adhesives will work well in oven curing environments. Backing materials of the type used for high-temperature masking tapes as described in International patent application No. WO 92/06794, may be used in particular, such as No. 2317 Hi Performance Paint Masking Tape and No. 219 High Temperature Fine Line Plastic Film Backing Material, both of which are available from the Minnesota Mining & Manufacturing Co. of St. Paul, Minn.

I claim:

1. Masking material suited to vehicular surface coating operations, comprising:

A thin, flexible base sheet having an inner surface and an outer surface and having opposing first and second longitudinal edges defining a width;

a first pressure-sensitive adhesive layer applied longitudinally along at least the first edge on the inner surface of the sheet, the adhesive layer having a width substantially less than that of the base sheet;

a second pressure sensitive adhesive layer applied longitudinally along the second edge on the outer surface of the sheet, the second adhesive layer having a width substantially less than that of the base sheet;

the base sheet further including a first longitudinal area on its outer surface and along the first edge which functions as a release layer, and a second longitudinal area on its inner surface along the second edge which functions as a release layer, the first and second longitudinal areas enabling the base sheet with adhesive layers to be provided in roll form and easily removed therefrom for use.

2. The masking material of claim 1, wherein the base sheet is selected from the group consisting of:

low-density polyethylene and high-density polyethylene.

3. The masking material of claim 1, wherein the base sheet and adhesive layers are able to withstand an oven curing temperature in excess of 250 degrees F. without substantial degradation.

4. The masking material of claim 3, wherein the base sheet is selected from the group consisting of:

polypropylene and nylon.

5. The masking material of claim 3, wherein the adhesive is selected from the group consisting of:

acrylics, rubber, and silicone.

* * * * *